United States Patent
Budhani et al.

(10) Patent No.: US 9,100,449 B2
(45) Date of Patent: Aug. 4, 2015

(54) VIRTUAL INLINE CONFIGURATION FOR A NETWORK DEVICE

(75) Inventors: Haseeb Budhani, Fremont, CA (US); Paul G. Sutter, San Francisco, CA (US)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 136 days.

(21) Appl. No.: 13/186,350

(22) Filed: Jul. 19, 2011

(65) Prior Publication Data
US 2012/0093156 A1    Apr. 19, 2012

Related U.S. Application Data

(63) Continuation of application No. 11/380,004, filed on Apr. 25, 2006, now Pat. No. 8,004,973.

(51) Int. Cl.
*H04L 29/08* (2006.01)
*H04L 12/54* (2013.01)

(52) U.S. Cl.
CPC ............ *H04L 67/2814* (2013.01); *H04L 12/56* (2013.01)

(58) Field of Classification Search
USPC ......... 370/230, 252, 254, 351, 389, 392, 400, 370/401
See application file for complete search history.

(56) References Cited

U.S. PATENT DOCUMENTS

| | | |
|---|---|---|
| 5,774,660 A | 6/1998 | Brendel et al. |
| 6,021,470 A | 2/2000 | Frank et al. |
| 6,640,240 B1 | 10/2003 | Hoffman et al. |
| 6,683,873 B1 * | 1/2004 | Kwok et al. ............... 370/389 |
| 6,687,732 B1 * | 2/2004 | Bector et al. .............. 709/200 |
| 6,772,203 B1 | 8/2004 | Feiertag et al. |
| 6,792,461 B1 * | 9/2004 | Hericourt ................... 709/225 |
| 6,834,297 B1 | 12/2004 | Peiffer et al. |
| 6,934,288 B2 | 8/2005 | Dempo et al. |
| 6,954,801 B1 | 10/2005 | Housel |
| 6,980,521 B1 * | 12/2005 | Jarvis ........................ 370/238 |
| 7,123,613 B1 * | 10/2006 | Chawla et al. .............. 370/389 |
| 7,161,947 B1 * | 1/2007 | Desai ......................... 370/401 |
| 2002/0013844 A1 * | 1/2002 | Garrett et al. ............. 709/225 |
| 2002/0016851 A1 | 2/2002 | Border |
| 2002/0034173 A1 | 3/2002 | Border et al. |
| 2002/0112152 A1 * | 8/2002 | VanHeyningen et al. ... 713/151 |

(Continued)

FOREIGN PATENT DOCUMENTS

| | | |
|---|---|---|
| CN | 1460347 A | 12/2003 |
| JP | 2002-247032 | 8/2002 |

(Continued)

OTHER PUBLICATIONS

Border, J. et at., PILC: Performance Enhancing Proxies (PEPS), 4 61h IETFN. Nov. 10, 1999. pp. 1-17.

(Continued)

*Primary Examiner* — Hong Cho
(74) *Attorney, Agent, or Firm* — Foley & Lardner LLP; Christopher J. McKenna; Daniel E. Rose

(57) ABSTRACT

A performance enhancing proxy network device is configured to operate in a virtual inline mode, in which selected network traffic is redirected to and through the network device by a router using simple routing policies. In this way, the network device can be coupled to the router in series but can still operate as if it were physically connected inline.

20 Claims, 3 Drawing Sheets

(56) References Cited

U.S. PATENT DOCUMENTS

| | | | |
|---|---|---|---|
| 2003/0123394 A1 | 7/2003 | Neale et al. | |
| 2003/0123481 A1 | 7/2003 | Neale et al. | |
| 2003/0131079 A1 | 7/2003 | Neale et al. | |
| 2004/0107360 A1 | 6/2004 | Herrmann et al. | |
| 2004/0165581 A1* | 8/2004 | Oogushi | 370/352 |
| 2004/0252693 A1* | 12/2004 | Cheriton et al. | 370/395.1 |
| 2005/0044108 A1 | 2/2005 | Shah et al. | |
| 2005/0063083 A1 | 3/2005 | Dart et al. | |
| 2005/0080876 A1 | 4/2005 | Peiffer et al. | |
| 2005/0094567 A1* | 5/2005 | Kannan et al. | 370/241 |
| 2005/0138176 A1* | 6/2005 | Singh et al. | 709/226 |
| 2005/0193075 A1 | 9/2005 | Haff et al. | |
| 2005/0198282 A1* | 9/2005 | Stahl et al. | 709/225 |
| 2006/0036570 A1 | 2/2006 | Schaefer et al. | |
| 2006/0143300 A1* | 6/2006 | See et al. | 709/227 |
| 2006/0190602 A1* | 8/2006 | Canali et al. | 709/226 |

FOREIGN PATENT DOCUMENTS

| | | |
|---|---|---|
| WO | WO-0235795 | 5/2002 |
| WO | WO-03001756 | 1/2003 |

OTHER PUBLICATIONS

Feighery P., Frequently Asked Questions (FAQ) for Performance Enhancing Proxies (PEPS). Hints on How to Configure PEPs, Online document, Jun. 27, 2005.
International Search Report for PCT/US2007/067263. Mailing date Aug. 22, 2007. 3 pages.
Written Opinion for PCT/US07/067263 dated Oct. 25, 2008.
First Office Action issued Aug. 10, 2011 in Chinese Patent Application No. 200780014567.2.
Office Action issued Dec. 12, 2011 in European Patent Application No. 07761162.2.
Office Action issued Sep. 14, 2011 in Japanese Patent Application No. 2009-507923.
Second Office Action issued Apr. 24, 2012 in Chinese Patent Application No. 200780014567.2.
Third Office Action issued Sep. 12, 2012 in Chinese Patent Application No. 200780014567.2.
US Notice of Allowance Dtd Apr. 19, 2011.
US Office Action Dtd Jan. 6, 2011.
US Office Action Dtd Sep. 9, 2010.

* cited by examiner

VIRTUAL INLINE CONFIGURATION FOR A NETWORK DEVICE

RELATED APPLICATION

This present application claims priority to and is a continuation of U.S. patent application Ser. No. 11/380,004, entitled "Virtual Inline Configuration for a Network Device", filed Apr. 25, 2006, and issued as U.S. Pat. No. 8,004,973 on Aug. 23, 2011, which is incorporated herein by reference in its entirety.

BACKGROUND OF THE INVENTION

Network devices, such as performance enhancing proxy network devices, are used in a variety of applications for enhancing the network traffic across a data connection or other characteristics of the connection. Deployed in the communication path of a network between a sender and recipient of data packets, these performance enhancing proxy network devices operate on the packets so as to increase reliability, speed, bandwidth, compression, security, and/or many other features of the existing network connection. To perform any function for the network, however, these devices must be coupled to the network in some way to receive and then retransmit at least some of the data packets being sent over the data connection.

In typical configurations, such as that shown in FIG. 1, a performance enhancing proxy network device 10, or proxy, is often deployed inline with the WAN link of a router 20. In this way, all traffic from a WAN 30 passes through the network device 10 before arriving at its destination computing system 15 on a LAN 5. This inline configuration requires a modest amount of physical re-wiring and downtime to establish the link. To deploy a network device 10 inline, the link must be broken, and then the device 10 to be installed must be connected in between the broken link. The installation is manually intensive, and it interrupts the network services unless there is a backup mechanism in place. In addition, it may be physically or electrically challenging to place a network device in line due to incompatible standards, such as a network device that uses Ethernet while the WAN link uses fiber optics.

Systems have been designed to allow for parallel installation of intermediate network devices, but these systems generally require that the data packets be addressed to the network devices. When the data packets are passed on to the true destination system, the destination address of the data packet must be changed so that the data packet is routed to its true destination. Such systems are undesirable for several reasons, primarily in that they lack transparency. The sending system must know of the existence and the address of the network device so that the data packet can be addressed to it. This limits the ability to implement one-sided optimization of network traffic, since remote senders must be configured for the local network device.

Alternatively, systems have been designed that allow transparency to be maintained from the point of view of the source and destination systems, but require that the packets be encapsulated in a different protocol to facilitate routing. One example of this is the WCCP protocol, used to connect network devices (typically Web proxy caches) to routers, encapsulating packets using the GRE protocol to allow the path taken between router and network appliance to be independent of the original packet routing. This method is transparent to the endpoints, but it is not transparent along the path between the router and the network device. Encapsulation is also accompanied by overhead and thus loss of performance.

Accordingly, there is a need for a method to allow a parallel installation of a network device while preserving the transparency and other benefits that an inline installation offers.

SUMMARY OF THE INVENTION

A performance enhancing proxy network device is deployed in a virtual inline configuration, which combines the benefits of inline and parallel configurations. With the network device installed in a configuration other than inline with the WAN link, a router redirects network traffic to the network device when data packets are to be sent over the network. The network device then performs any desired processing on the received data packets. Once the processing is completed, the network device sends packets to the router to be transferred to the destination over the network. In this way, the network device can be coupled to the router in parallel but can still operate as if it were inline. This requires less physical rewiring and downtime for a communication link. This method also provide transparency in the rerouting of data packets, as the source and destination addresses and port information are preserved for each data packet as the packet (or its transformed equivalent) is routed through the network from source to destination.

DETAILED DESCRIPTION OF THE PREFERRED EMBODIMENTS

Figure 1:
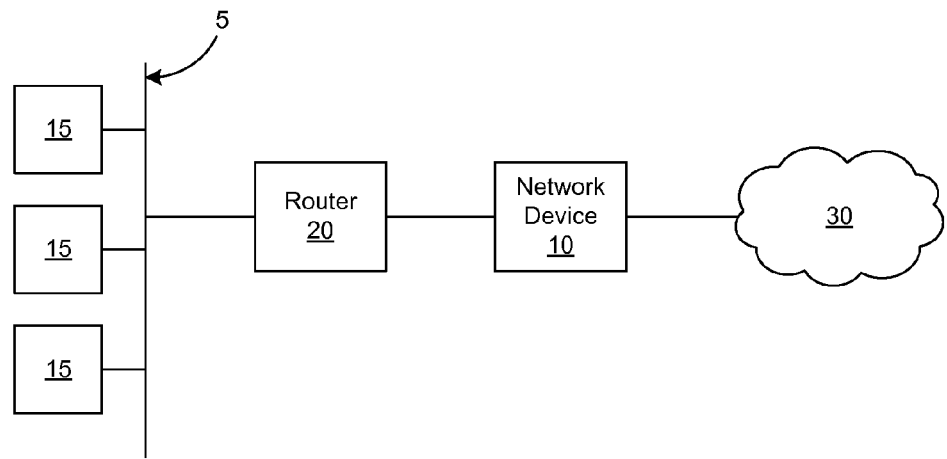
FIG. 1 is a schematic network diagram of a typical inline configuration for a network device, as found in the prior art.
Figure 2:
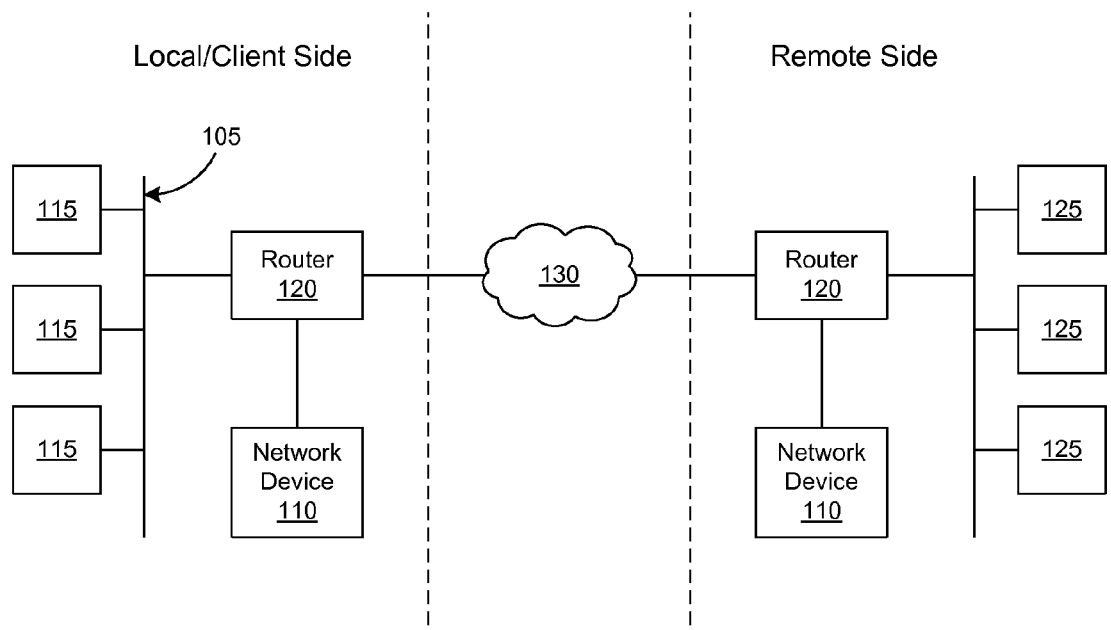
FIG. 2 is a schematic network diagram of a virtual inline configuration for a network device, in accordance with an embodiment of the invention.

FIG. 2 illustrates a network architecture of a typical communications network, in which one or more computing systems 115 on a LAN 105 communicate with one or more remote computing systems 125 over a WAN 130 (such as the Internet). One or more routers 120 at each end of the network handle the routing of data packets among the computing systems 115 and 125.

A performance enhancing proxy network device 110 is installed at the local and remote sides of the network. Alternatively, a performance enhancing proxy network device 110 may be installed at only one of the ends of the network, although this allows for less functionality. Performance enhancing proxy network devices, such as those described in U.S. application Ser. No. 10/901,952, filed Jul. 28, 2004, which is incorporated by reference in its entirety, are used to enhance the network traffic across a data connection or other characteristics of the connection.

To avoid a physical inline architecture, the network devices 110 are coupled to the router 120 in a parallel configuration. This allows for easier installation and avoids other problems inherent in inline configurations. As described below, the router 120 is configured to divert or redirect incoming data packets from the WAN 130 to the LAN 105 or outgoing data packets from the LAN 105 to the WAN 130. The router 120 may be configured to divert all data packets or only certain data packets, according to predefined criteria. The data packets that are diverted by the router 120 are sent to the network device 110, which may then process the data packets to perform the enhancement processing for which the network devices 110 is designed. After the processing, the network device 110 returns the data packets to the router 120, which sends the data packets along to their original destination.

The network device 110 may choose to transform none, some, or all of the packets it receives. Accordingly, the packets that the network device 110 "forwards" to the router 120 may have been transformed in a way that causes the packets to be different from the input packets in some way while maintaining the transparency of the system. For example, compression performed by the network device 110 may cause the transformed packets to be fewer in number and/or smaller in size than the original packets.

In one embodiment of the invention, the data packets have a destination address that specifies a local or remote computing system 115 or 125, rather than a network device 110. When these data packets are received by a router 120, the router diverts the data packets to a network device 110. Once the router 120 receives the data packet back from the network device 110, the router 120 forwards the packet to a destination on the network according to the destination address of the data packet. Because the destination address of each diverted data packet does not have to be changed to accomplish the diversion, the enhanced processing and configuration of the network device is transparent to the network—much like an inline configuration can be. In this way, the configuration of the network device 110 is virtually inline, while being physically connected in parallel.

Figure 3:
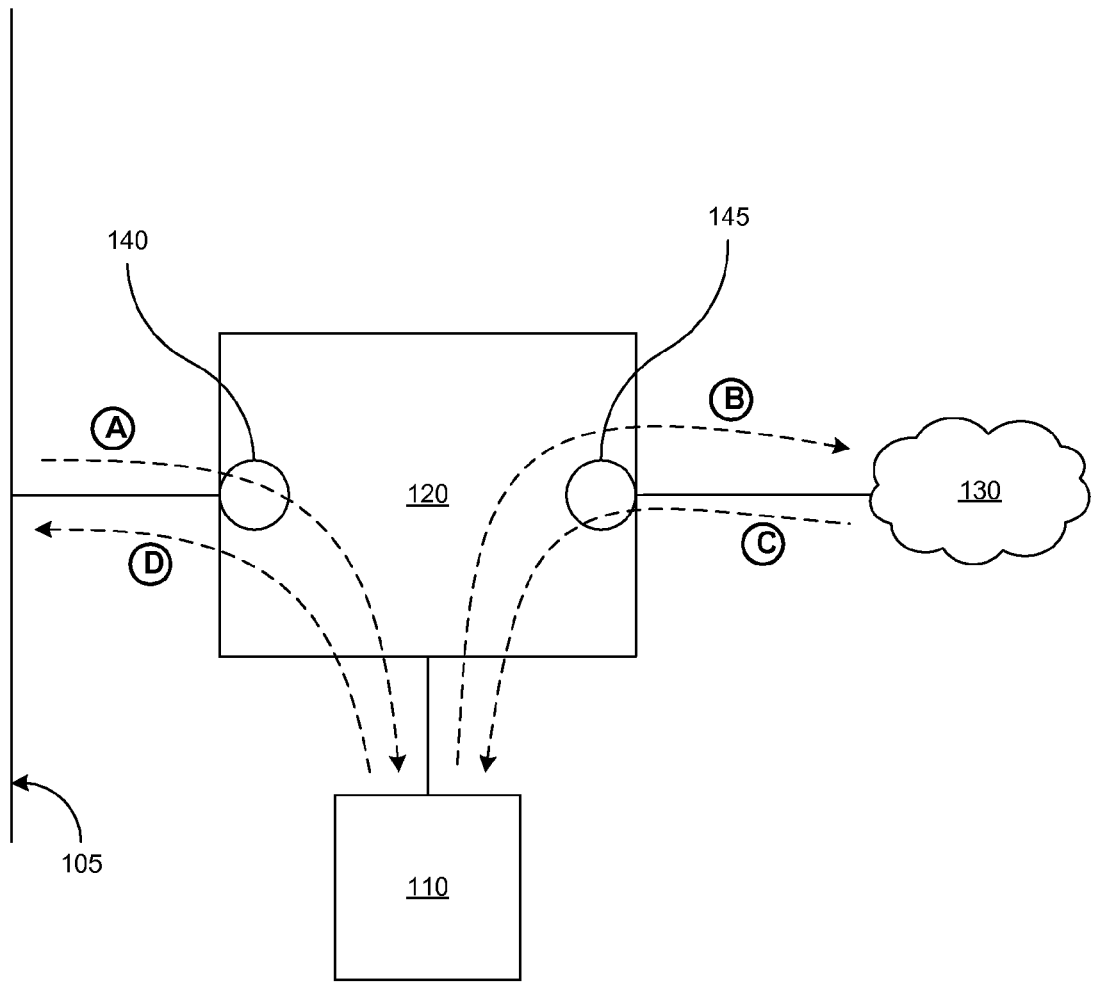
FIG. 3 is a schematic diagram of a router and network device in a virtual inline configuration, showing the policy based routing rules that reroute certain incoming and outgoing data packets, in accordance with an embodiment of the invention.

FIG. 3 illustrates one embodiment of a router 120 configured to divert data packets to a network device 110. The router 120 includes a set of rules 140 at its LAN side that apply to outgoing data packets received from the LAN 105. The LAN-side rules 140 operate on data packets received by the router 120 from the LAN 105, illustrated by dotted path A passing through the rules 140. The LAN-side rules 140 may be configured to divert to the network device 110 all of the data packets received, or just some of the data packets based on predetermined criteria. Data packets returned by the network device 110 are then forwarded to their destination over the WAN 130 according to their destination address, illustrated by dotted path B.

In the inbound direction, incoming data packets are received over a WAN 130 by the router 120. The router 120 includes a set of rules 145 at its WAN side that apply to incoming data packets received from the WAN 130. The WAN-side rules 145 operate on data packets received by the router 120 from the WAN 130, illustrated by dotted path C passing through the rules 145. The WAN-side rules 145 may be configured to divert to the network device 110 all of the data packets received, or just some of the data packets based on predetermined criteria. Data packets returned by the network device 110 are then forwarded to their destination through the LAN 105 according to their destination address, illustrated by dotted path D.

By diverting the data packets according to the rules 140 and 145, instead of by changing their destination addresses, the destination addresses of the data packets can be left unchanged. In this way, diverting the data packets to the network device 110 is transparent to the network. In one embodiment, the rules 140 and 145 used to divert the data packets are policy based routing (PBR) rules, which include a well known set of rules for routing IP packets. The data packets may be IP packets, according to the Internet Protocol (IP).

As explained above, the router 120 may be configured with PBR rules at each of the local and remote sides to divert incoming and outgoing data packets. The PBR rules at the local (or client) side of the router 120 divert data packets received from the LAN 105 to the network device 110. The PBR rules at the remote side of the router 120 divert data packets received from the WAN 130 to the network device 110.

In one embodiment, the router 120 is configured on the local side using the following configuration:

```
!
ip cef
!
interface FastEthernet0/0
    ip address 10.10.10.5 255.255.255.0
    ip policy route-map client_side_map
!
interface FastEthernet0/1
    ip address 171.68.1.5 255.255.255.0
    ip policy route-map wan_side_map
!
interface FastEthernet1/0
    ip address 192.168.1.5 255.255.255.0
!
ip classless
ip route 0.0.0.0 0.0.0.0 171.68.1.1
!
ip access-list extended client_side
    permit ip 10.10.10.0 0.0.0.255 20.20.20.0 0.0.0.255
ip access-list extended wan_side
    permit ip 20.20.20.0 0.0.0.255 10.10.10.0 0.0.0.255
!
route-map wan_side_map permit 20
    match ip address wan_side
    set ip next-hop 192.168.1.200
!
route-map client_side_map permit 10
    match ip address client_side
    set ip next-hop 192.168.1.200
!
```

Similarly, at the remote side, the router 120 is configured using the following configuration:

```
!
ip cef
!
interface FastEthernet0/0
    ip address 20.20.20.5 255.255.255.0
    ip policy route-map client_side_map
!
interface FastEthernet0/1
    ip address 171.68.2.5 255.255.255.0
    ip policy route-map wan_side_map
!
interface FastEthernet1/0
    ip address 192.168.2.5 255.255.255.0
!
ip classless
ip route 0.0.0.0 0.0.0.0 171.68.2.1
!
ip access-list extended client_side
    permit ip 20.20.20.0 0.0.0.255 10.10.10.0 0.0.0.255
```

-continued

```
ip access-list extended wan_side
    permit ip 10.10.10.0 0.0.0.255 20.20.20.0 0.0.0.255
!
route-map wan_side_map permit 20
    match ip address wan_side
    set ip next-hop 192.168.2.200
!
route-map client_side_map permit 10
    match ip address client_side
    set ip next-hop 192.168.2.200
!
```

These configurations conform to the Cisco IOS CLI, and for other routers from different vendors, a different configuration may be used.

In the above examples, an access list is applied to a route-map, which is in turn attached to an appropriate interface. For the client_side access list, all IP packets with source matching 20.20.20.00.0.0.255 and destination 10.10.10.00.0.0.255 are matched. For the wan_side access list, all IP packets with source matching 10.10.10.00.0.0.255 and destination 20.20.20.00.0.0.255 are matched.

In the example above, all matching IP traffic is diverted to the network device. In other embodiments, the router 120 is configured to divert only selected data packets. For example, the router 120 may be configured to divert only TCP traffic to the network device. This can be accomplished, in one embodiment, by changing the access-list configuration to redirect only TCP packets. In the example described above, the configuration of the remote side could be modified as follows to accomplish this (with only the portion modified reproduced):

```
!
ip access-list extended client_side
    permit tcp 20.20.20.0 0.0.0.255 10.10.10.0 0.0.0.255
ip access-list extended wan_side
    permit tcp 10.10.10.0 0.0.0.255 20.20.20.0 0.0.0.255
!
```

The local side could also be modified in a corresponding way (i.e., changing "ip" to "tcp"), so that the PBR rules at the local and remote sides remained symmetrical.

In another embodiment, the router 120 can be configured to divert only data packets having a source and/or destination address within a defined range. Continuing the example described above, to configured the router 120 to divert IP packets having a source address within the range 10.10.10.0 to 10.10.10.100 and destination address within 20.20.20.0 to 20.20.20.100, the following access list can be used:

```
!
ip access-list extended test_list
    permit ip 10.10.10.0 0.0.0.100 20.20.20.0 0.0.0.100
!
```

These are just a few examples of criteria and techniques for diverting incoming and outgoing data packets received by the router 120 to the network device. For example, data packets may be diverted based on their directions, subnet, and/or service. The PBR rules, as well as other mechanisms for configuring routers, allow for a variety of additional criteria for determining which data packets to divert, as well as different methods of doing so. Preferably, the PBR rules are configured so that the LAN and WAN sides of the router 120 are configured in a way that is symmetric and reverse, as in the example above.

Figure 4:
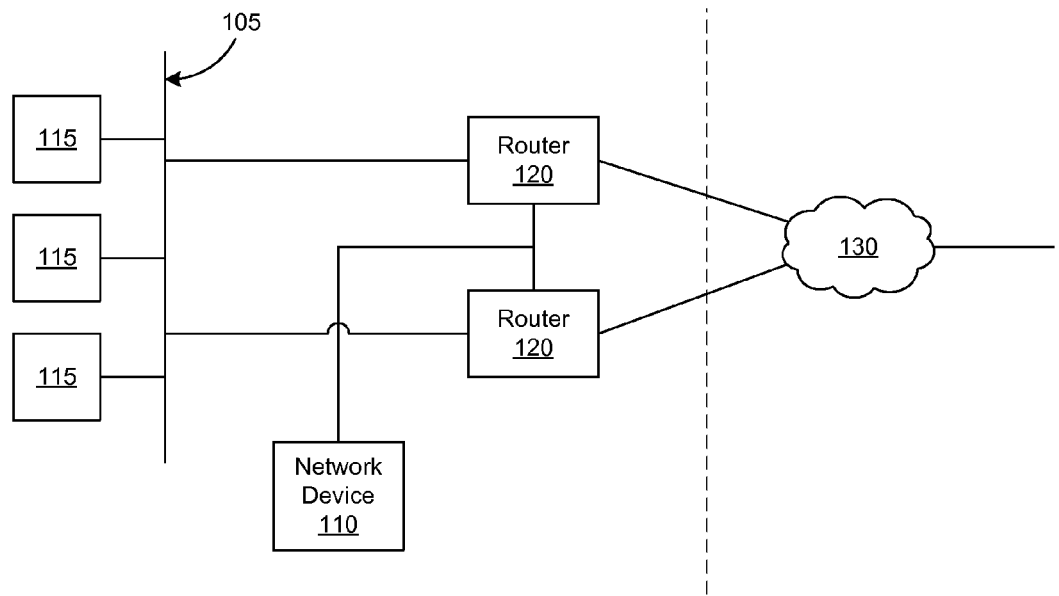
FIG. 4 is a schematic diagram of a local side of a network configuration in which multiple routers share a network device, in accordance with an embodiment of the invention.

FIG. 4 illustrates a local side of a network configuration in which two or more routers 120 share a network device 110, which is coupled to the routers in a virtual inline configuration. Each router 120 is configured to divert some or all of the incoming and/or outgoing data packets, in accordance with any of the techniques described herein. When the network device 110 is finished processing a diverted data packet, the network device 110 may be configured to send the data packet to either router 120, for delivery according to the data packet's destination address.

In one embodiment, the network device 110 is configured to send all data packets to one of the routers 120, as long as that pre-selected router 120 is able to receive the data packet. This scheme creates a sort of "master" router that handles all processed data packets unless the router fails or has insufficient resources. In another embodiment, the network device 110 is configured to send each data packet back to the router 120 that originally diverted the data packet. By always returning the data packets to their original routers 120, this scheme preserves any load balancing that is applied between or among the routers 120. This scheme is made possible, in part, due to the transparency of the technique, Other systems that change the destination address of the data packets to redirect them may not be able to preserve load balancing applied to the network.

Figure 5:
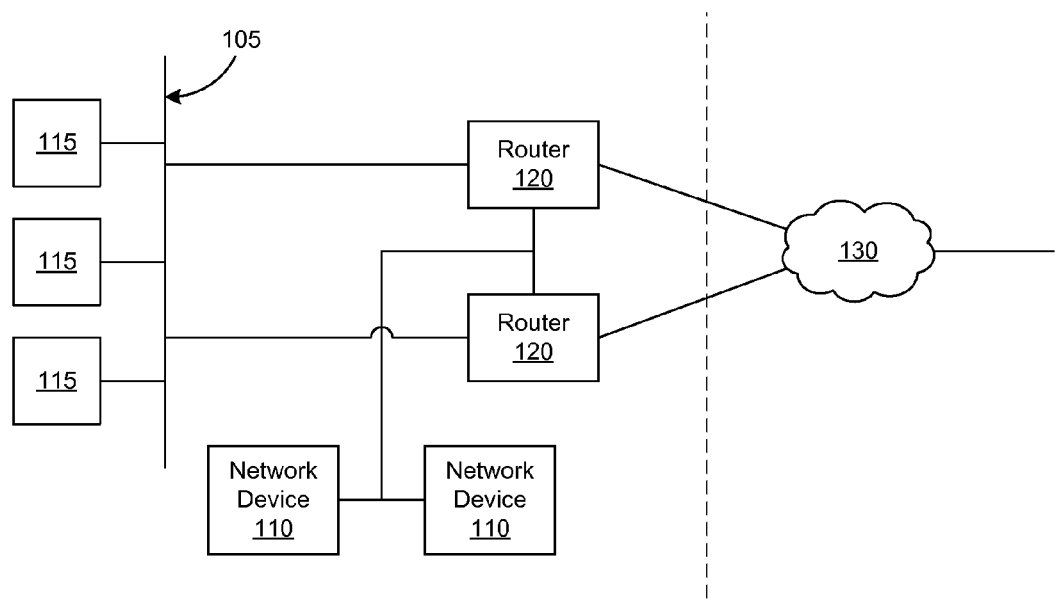
FIG. 5 is a schematic diagram of a local side of a network configuration in which multiple routers share multiple network devices, in accordance with an embodiment of the invention.

FIG. 5 illustrates a configuration in which multiple routers 120 share multiple network devices 110, which are coupled to the routers in a virtual inline configuration. Each router 120 is configured to divert some or all of the incoming and/or outgoing data packets to one or both of the network devices 110, in accordance with any of the techniques described herein. The network devices 110 may perform different enhancement processing tasks, where data packets are diverted to one or more of the network devices 110 based on the desire to apply the corresponding enhancement processing to each data packet.

Alternatively, the network devices 110 may perform the same processing, in which multiple network devices 110 are used to handle a larger bandwidth or so that one or more network devices 110 can serve as a backup to the primary network device 110 in case of a failure. In a backup scheme, the routers 120 may be configured to send the data packets to a virtual address, and the designated primary network device 110 is configured to receive network traffic sent to that virtual address. In the event of a failure of that primary device 110, the network detects the failure and configures the other network device 110 to receive network traffic sent to the virtual address. In this way, the secondary network device 110 performs the enhancement processing upon failure of the primary. Various other configurations for redundancies may be applied with this virtual inline configuration.

As used herein, the term router is meant broadly to encompass any hardware or software system that routes network traffic, and it may include access points, gateways, servers, and the like. Various alternative configurations other than those shown in the figures may be used with embodiments of the invention, and any number of routers and networks devices (of the same or multiple types) can be added to the system in a virtual inline configuration as described above.

Accordingly, the foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above teachings. It is therefore intended that the scope of the invention be limited not by this detailed description, but rather by the claims appended hereto.

The invention claimed is:

1. A method for processing a packet, destined to a computing device, via a network device coupled in parallel to a router, the method comprising:
   receiving, by a network device having a first internet protocol (IP) address and coupled to a plurality of routers, a packet from a first router of the plurality of routers, the packet having a second destination IP address of an intended destination computing device;
   identifying, by the network device, the first router of the plurality of routers as the router that diverted the packet to the network device;
   preserving, by the network device, the identification of the first router of the plurality of routers as the router that diverted the packet to the network device;
   processing, by the network device, the packet while preserving the second destination IP address of the packet to specify the intended destination computing device; and
   transmitting, by the network device, the processed packet to the first router for transmission to the intended destination computing device, based on the preserved identification of the first router of the plurality of routers as the router that diverted the packet to the network device, the processed packet transmitted with the second destination internet protocol (IP) address of the intended destination computing device.

2. The method of claim 1, further comprising receiving, by the network device, the packet having the second destination IP address diverted by the first router via Internet Protocol (IP) layer routing without the first router replacing the second destination IP address of the packet with the first IP address of the network device.

3. The method of claim 2, further comprising diverting, by the first router, the packet according to the second destination IP address of the packet matching a policy based IP routing rule of a set of IP routing rules instead of changing the second destination IP address of the packet to the first IP address of the network device.

4. The method of claim 1, further comprising sending, by the first router, the processed packet to the computing device identified by the second destination IP address.

5. The method of claim 1, wherein preserving the identification of the first router further comprises preserving, by the network device, the selection of the first router from load balancing applied to the plurality of routers.

6. The method of claim 1, further comprising processing, by the network device, the packet by transforming the packet.

7. The method of claim 1, further comprising processing, by the network device, the packet by compressing the packet.

8. The method of claim 1, further comprising receiving, by the network device, the packet diverted by the first router based on one or more of the following: direction, subnet or service.

9. The method of claim 1, wherein the packet is diverted to the network device without the first router changing the destination address of the packet from the second IP address of the intended destination computing device.

10. The method of claim 1, wherein the network device does not change the second destination IP address of the received packet before transmitting the processed packet to the first router.

11. The method of claim 1, wherein receiving the packet from the first router further comprises receiving the packet from the first router as a next hop from the router to the computing device.

12. The method of claim 1, wherein the network device is deployed in a virtual inline configuration.

13. A system for processing a packet, destined to a computing device, via a network device coupled in parallel to a router, the system comprising:
   a network device having a first internet protocol (IP) address, coupled to a plurality of routers, the network device receiving a packet from a first router of the plurality of routers, the packet having a second destination internet protocol (IP) address of an intended destination computing device; and
   wherein the network device
      identifies the first router of the plurality of routers as the router that diverted the packet to the network device,
      preserves the identification of the first router of the plurality of routers as the router that diverted the packet to the network device,
      processes the packet while preserving the second destination IP address of the packet to specify the intended destination computing device, and
      transmits the processed packet to the first router for transmission to the intended destination computing device based on the preserved identification of the first router of the plurality of routers as the router that diverted the packet to the network device, the processed packet transmitted with the second destination internet protocol (IP) address of the intended destination computing device.

14. The system of claim 13, wherein the network device receives the packet having the second destination IP address diverted by the first router via Internet Protocol (IP) layer routing without the first router replacing the second destination IP address of the packet with the first IP address of the network device.

15. The system of claim 14, wherein the first router diverts the packet according to the second destination IP address of the packet matching a policy based IP routing rule of a set of IP routing rules instead of changing the second destination IP address of the packet to the first IP address of the network device.

16. The system of claim 13, wherein the first router transmits the processed packet to the computing device identified by the second destination IP address.

17. The system of claim 13, wherein the network device preserves the identification of selection of the first router from load balancing applied to the plurality of routers.

18. The system of claim 13, wherein the network device processes the packet by transforming the packet.

19. The system of claim 13, wherein the network device processes the packet by compressing the packet.

20. The system of claim 13, wherein the network device receives the packet diverted by the first router based on one or more of the following: direction, subnet or service.

* * * * *